US008736220B2

(12) United States Patent
Ogawa et al.

(10) Patent No.: US 8,736,220 B2
(45) Date of Patent: May 27, 2014

(54) INVERTER CONTROL DEVICE AND POWER CONVERSION DEVICE

(75) Inventors: Takurou Ogawa, Shiga (JP); Hiroshi Hibino, Shiga (JP); Masanobu Tomoe, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 87 days.

(21) Appl. No.: 12/989,799

(22) PCT Filed: Apr. 28, 2009

(86) PCT No.: PCT/JP2009/001939
§ 371 (c)(1),
(2), (4) Date: Oct. 27, 2010

(87) PCT Pub. No.: WO2009/133700
PCT Pub. Date: Nov. 5, 2009

(65) Prior Publication Data
US 2011/0043150 A1 Feb. 24, 2011

(30) Foreign Application Priority Data
Apr. 28, 2008 (JP) ................................. 2008-117102

(51) Int. Cl.
*H02P 21/00* (2006.01)
*H02P 27/04* (2006.01)
(52) U.S. Cl.
USPC ................. 318/801; 318/400.01; 318/400.13; 318/805; 318/807
(58) Field of Classification Search
USPC ......... 318/801, 802, 805, 807, 254.1, 400.26, 318/400.01, 400.13, 439; 363/36, 37, 97, 363/41, 50
See application file for complete search history.

(56) References Cited

U.S. PATENT DOCUMENTS 3,585,488 A * 6/1971 Gutt et al. ...................... 363/135
5,068,777 A * 11/1991 Ito ................................... 363/97

(Continued)

FOREIGN PATENT DOCUMENTS

| JP | H01-161162 A | 6/1989 |
| JP | 3-145906 A | 6/1991 |

(Continued)

OTHER PUBLICATIONS

"Design and Control of Interior Permanent Magnet Synchronous Motor" by Takeda, Matsui, Morimoto and Honda, Ohmsha Ltd., Oct. 25, 2001, pp. 23-29.

*Primary Examiner* — Paul Ip
(74) *Attorney, Agent, or Firm* — Birch, Stewart, Kolasch & Birch, LLP.

(57) ABSTRACT

A DC voltage value from a DC voltage detection section is input directly to a voltage correction section without passing through a compensator or a filter. Therefore, even when rapid voltage change occurs, such as short power interruptions, instantaneous voltage drop and return from instantaneous voltage drop, the voltage correction section can quickly perform the correction operation in response to the rapid voltage change. Since the amount of link resonance compensation is limited by the limitation section to a certain range, it is possible to prevent the amount of link resonance compensation from fluctuating excessively upon rapid voltage change. Since the amount of link resonance compensation which is limited by the limitation section to a certain range is input to one compensator that has an appropriate control band, among all control calculation sections, the response does not have to be unnecessarily fast, thus realizing a stable control.

23 Claims, 5 Drawing Sheets

(56) References Cited

U.S. PATENT DOCUMENTS

| | | | |
|---|---|---|---|
| 5,959,430 A * | 9/1999 | Yuki et al. | 318/805 |
| 6,175,217 B1 * | 1/2001 | Da Ponte et al. | 322/19 |
| 6,244,061 B1 * | 6/2001 | Takagi et al. | 62/229 |
| 6,801,019 B2 * | 10/2004 | Haydock et al. | 322/17 |
| 6,969,968 B2 * | 11/2005 | Throngnumchai | 318/807 |
| 7,095,208 B2 * | 8/2006 | Kawaji et al. | 318/801 |
| 7,102,306 B2 * | 9/2006 | Hamaoka et al. | 318/400.01 |
| 7,164,590 B2 * | 1/2007 | Li et al. | 363/40 |
| 7,330,011 B2 * | 2/2008 | Ueda et al. | 318/807 |
| 7,355,866 B2 * | 4/2008 | Hsieh et al. | 363/50 |
| 7,541,687 B2 * | 6/2009 | Stahlhut et al. | 290/52 |
| 7,633,249 B2 * | 12/2009 | Sekimoto et al. | 318/254.1 |
| 7,639,518 B2 * | 12/2009 | Shin et al. | 363/41 |
| 7,728,562 B2 * | 6/2010 | Kajouke et al. | 323/222 |
| 7,781,904 B2 * | 8/2010 | Stahlhut et al. | 290/52 |
| 7,907,427 B2 * | 3/2011 | Sakakibara et al. | 363/37 |
| 8,138,712 B2 * | 3/2012 | Yamada | 318/807 |
| 2001/0035018 A1 * | 11/2001 | Takagi et al. | 62/228.4 |
| 2003/0107349 A1 * | 6/2003 | Haydock et al. | 322/28 |
| 2004/0095789 A1 * | 5/2004 | Li et al. | 363/132 |
| 2004/0217728 A1 * | 11/2004 | Kawaji et al. | 318/801 |
| 2005/0012490 A1 * | 1/2005 | Ueda et al. | 318/807 |
| 2005/0140330 A1 * | 6/2005 | Throngnumchai | 318/807 |
| 2006/0082339 A1 * | 4/2006 | Hamaoka et al. | 318/439 |
| 2006/0187683 A1 * | 8/2006 | Hsieh et al. | 363/10 |
| 2007/0210584 A1 * | 9/2007 | Stahlhut et al. | 290/52 |
| 2007/0279948 A1 * | 12/2007 | Shin et al. | 363/41 |
| 2008/0089444 A1 * | 4/2008 | Shin et al. | 375/326 |
| 2008/0094864 A1 * | 4/2008 | Sekimoto et al. | 363/36 |
| 2009/0027933 A1 * | 1/2009 | Kajouke et al. | 363/97 |
| 2009/0224541 A1 * | 9/2009 | Stahlhut et al. | 290/7 |
| 2009/0237961 A1 * | 9/2009 | Sakakibara et al. | 363/37 |
| 2010/0164416 A1 * | 7/2010 | Yamada | 318/400.13 |
| 2010/0237821 A1 | 9/2010 | Kitanaka | |
| 2011/0043150 A1 * | 2/2011 | Ogawa et al. | 318/400.26 |

FOREIGN PATENT DOCUMENTS

| | | |
|---|---|---|
| JP | 7-36702 B2 | 4/1995 |
| JP | 3212354 B2 | 9/2001 |
| JP | 2002-252936 A | 9/2002 |
| JP | 2005-198442 A | 7/2005 |
| JP | 2007-181358 A | 7/2007 |
| JP | 2007-282312 A | 10/2007 |
| JP | 4065901 B1 | 3/2008 |

\* cited by examiner

US 8,736,220 B2

INVERTER CONTROL DEVICE AND POWER CONVERSION DEVICE

TECHNICAL FIELD

The present invention relates to a technique for controlling an inverter for driving an AC motor.

BACKGROUND ART

Typically, a voltage-fed inverter having a filter capacitor in the DC link section performs a constant output voltage control for reducing fluctuation of the output voltage due to fluctuation of the DC input voltage. FIG. 1 shows a schematic configuration of a conventional inverter device for performing the constant output voltage control. Note that the control system is shown simplified in FIG. 1. While an output current detection section (160) is provided between an inverter section (140) and a motor (150), the configuration may be any configuration as long as the current output to the motor (150) can be detected, and it may for example be a configuration where a shunt resistor is provided in the DC link section so as to detect the current.

The inverter device of FIG. 1 includes an inverter control section (200) which is a control section. The inverter control section (200) performs a correction by a voltage correction section (202) so that the output voltage is not influenced by the fluctuation of the DC voltage input to the inverter section (140). Specifically, the DC voltage value input to the inverter section (140) is detected by a DC voltage detection section (210) and given to the voltage correction section (202). The voltage correction section (202) performs a voltage correction by dividing the voltage command value by the DC voltage value (see, for example, conventional examples of Patent Documents 1 and 2).

A PWM calculation section (203) calculates a control signal for PWM control of the inverter section (140) based on the voltage command value from the voltage correction section (202), and the switching element of the inverter section (140) is turned ON/OFF in response to the control signal.

FIG. 1 shows a control system which assumes a synchronous motor as the motor (150). The control of the synchronous motor is typically performed based on a motor model which has been coordinate-converted onto the d-q coordinate system. [Expression 1] shows the equation of state of the synchronous motor which has been coordinate-converted onto the d-q coordinate system.

$v_d = (R+sL_d)i_d - \omega L_q i_q$ $v_q = (R+sL_q)i_q + \omega L_d i_d + \omega \phi_a$ [Expression 1]

A speed controller (204) and a current controller (206) perform PI control, for example. [Expression 2] shows the transfer function of the current controller (206) where PI control is performed.

$$v_d^* = \underbrace{K_{id}\left(1 + \frac{1}{T_{id} \cdot s}\right)(i_d^* - i_d)}_{PI\ COMPENSATOR} - \underbrace{\omega L_q i_q}_{NON\text{-}INTERFERING\ CONTROL}$$ [Expression 2]

$$v_q^* = \underbrace{K_{iq}\left(1 + \frac{1}{T_{iq} \cdot s}\right)(i_q^* - i_q)}_{PI\ COMPENSATOR} + \underbrace{\omega L_d i_d + \omega \phi_a}_{NON\text{-}INTERFERING\ CONTROL}$$

For example, a current vector controller (205) performs id*=0 control, maximum torque control, flux-weakening control, etc. (see, for example, Non-Patent Document 1).

Typically, the control band of a current control system formed by the current controller (206) is set to be greater than that of a speed control system formed by the speed controller (204). With a driving motor of a compressor, for example, it is often the case that the control band of the speed control system is set to about 10 Hz and the control band of the current control system to about 200 Hz. Arithmetic operations that need to be controlled at higher speed need to be performed without the intervention of the speed control system or the current control system, and the voltage correction operation by the voltage correction section (202) shown in FIG. 1 is one of these operations.

Now, the voltage correction performed by the voltage correction section (202) will be described in detail.

[Expression 3] shows the output voltage (average voltage value) V⁻ in a case where the inverter section (140) is PWM-controlled with a carrier period T and a pulse width τ under the DC input voltage $V_{DC}$ (see FIG. 2).

$$\overline{V} = \frac{1}{T}(V_{DC} \times \tau)$$ [Expression 3]

The pulse width τ is obtained by [Expression 4] so that the output voltage V⁻ and the output command voltage V* are equal to each other irrespective of the DC input voltage $V_{DC}$. In this expression, by dividing V* by $V_{DC}$, a voltage correction is performed so that the output voltage V⁻ does not fluctuate (herein, the operation of dividing by $V_{DC}$ is referred to as a voltage correction). With such an operation, it is possible to reduce the fluctuation of the output voltage V⁻ to the fluctuation of $V_{DC}$.

$$\tau = \frac{V^*}{V_{DC}}T$$ [Expression 4]

Here, assuming that the value of the current input to the inverter section (140) is $I_{DC}$, the input power $P_{in}$ is as follows.

$P_{in} = V_{DC} I_{DC}$

The output power $P_{out}$ of the inverter section (140) is controlled at a constant value through the voltage correction by the voltage correction section (202), and the following holds.

$P_{in} = P_{out} = P$ (constant) [note that loss at inverter section (140) is ignored]

Thus, the input current is $I_{DC} = P/V_{DC}$.

Therefore, the input voltage $V_{DC}$ and the input current $I_{DC}$ of the inverter section (140) are in such a relationship that $I_{DC}$ decreases as $V_{DC}$ increases, and $I_{DC}$ increases as $V_{DC}$ decreases. That is, where the constant output voltage control is performed, the inverter section (140), as viewed from the input side, exhibits characteristics of a negative resistor.

On the other hand, an LC filter including a reactor (120) and a capacitor (130) may undergo a phenomenon (link resonance) where it resonates at a resonance frequency $f_0$ shown in [Expression 5].

$$f_0 = \frac{1}{2\pi\sqrt{LC}}$$ [Expression 5]

In order to reduce the link resonance, a control needs to be performed where the output of the inverter section (140) is increased so as to reduce the increase of $V_{DC}$ when $V_{DC}$ is increasing whereas the output of the inverter section (140) is reduced so as to reduce the decrease of $V_{DC}$ when $V_{DC}$ is decreasing, i.e., a control such that $I_{DC}$ increases when $V_{DC}$ increases whereas $I_{DC}$ decreases when $V_{DC}$ decreases. However, if the constant output voltage control described above is performed, the link resonance cannot be reduced because a correction is performed by the voltage correction section (202) in the opposite direction to reducing the link resonance ($V_{DC}$ increase→$I_{DC}$ decrease, $V_{DC}$ decrease→$I_{DC}$ increase).

CITATION LIST

Patent Document

PATENT DOCUMENT 1: Japanese Examined Patent Publication No. H07-36702 (Japanese Patent No. 2004329)
PATENT DOCUMENT 2: Japanese Patent No. 3212354

Non-Patent Document

NON-PATENT DOCUMENT 1: "Design And Control Of Interior Permanent Magnet Synchronous Motor" by Takeda, Matsui, Morimoto and Honda, Ohmsha Ltd. 2001 Oct. 25

SUMMARY OF THE INVENTION

Technical Problem

For the problem described above, Patent Document 2 discloses a control method in which the constant output voltage control and the link resonance reduction control can be performed simultaneously without detracting from advantages of each other to realize their advantageous effects. As shown in FIG. 1 of Patent Document 2, with this control method, the DC voltage detected by a DC voltage detector (6) is supplied to a voltage calculation correction circuit (11) with a delay (14) equivalent to the time constant. The voltage calculation correction circuit (11) performs the voltage correction by a DC voltage value (110) which is given the delay (14) equivalent to the time constant. A correction (13) is performed by adding the amount of fluctuation (102) of the DC input voltage to a corrected value (106) obtained by the voltage calculation correction circuit (11). Thus, interference between the constant output voltage control and the link resonance reduction control is prevented by separating the controls by frequency by introducing a delay equivalent to the time constant.

However, with the control method shown in FIG. 1 of Patent Document 2, the DC voltage value input to the voltage calculation correction circuit (11) is delayed by the delay (14) equivalent to the time constant, and therefore the response of the voltage calculation correction circuit (11) is delayed to thereby adversely influence the control when the input voltage to an inverter section (4) changes rapidly (e.g., upon short power interruptions, upon instantaneous voltage drop, upon return from instantaneous voltage drop, etc.). Particularly, when the input voltage of the inverter section (4) increases rapidly, the output voltage increases due to the delay of the response of the voltage calculation correction circuit (11), and moreover the output voltage of the inverter section (4) increases due to the link resonance reduction control described above, thus resulting in overcurrent.

A primary object of the present invention is to provide an inverter control device with which it is possible to perform the constant output voltage control and the link resonance reduction control simultaneously without detracting from advantages of each other to realize their advantages.

Solution to the Problem

A first aspect is directed to a device for controlling an inverter (140) which converts DC power supplied thereto via an LC filter including a reactor (120) and a capacitor (130) into AC power having an intended frequency and an intended voltage value, and supplies the converted power to an AC motor (150).

In the first aspect, within a predetermined frequency band of fluctuation of a DC voltage supplied to the inverter (140), the inverter control device increases an inverter output voltage supplied from the inverter (140) to a motor when the DC voltage increases, and decreases the inverter output voltage when the DC voltage decreases, whereas outside the predetermined frequency band of the DC voltage, the inverter control device reduces fluctuation of the inverter output voltage due to fluctuation of the DC voltage.

A second aspect is according to the first aspect, wherein the predetermined frequency band of the DC voltage fluctuation includes at least a resonance frequency of the LC filter.

A third aspect is according to the second aspect, wherein the predetermined frequency band of the DC voltage fluctuation is less than or equal to a frequency band of a feedback control such that a current supplied to the AC motor (150) follows a command value.

A fourth aspect is according to the second or third aspect, wherein the predetermined frequency band is set to be less than a frequency of voltage ripples due to an AC power supply (100).

A fifth aspect is according to one of the first to fourth aspects, wherein, the inverter control device operates based on an amount of fluctuation of a predetermined frequency band component of the DC voltage so as to decrease a rate of increase in an inverter output voltage supplied from the inverter (140) to the motor with respect to an amount of increase in the DC voltage, and to decrease a rate of decrease in the inverter output voltage with respect to an amount of decrease in the DC voltage, as the amount of fluctuation is larger.

A sixth aspect is directed to a device for controlling an inverter (140) which converts DC power supplied thereto via an LC filter including a reactor (120) and a capacitor (130) into AC power having an intended frequency and an intended voltage value, and supplies the converted power to an AC motor (150).

In the sixth aspect, the device includes: control calculation sections (204-208) for calculating an output voltage command; an output voltage correction section (202) for directly receiving a DC voltage value from a DC voltage detection section (201) which detects a voltage of DC power supplied to the inverter (140) so as to correct an output voltage command from the control calculation sections (204-208) based on the DC voltage value; a PWM calculation section (203) for calculating a control signal for PWM-controlling the inverter (140) based on an output voltage command from the output voltage correction section (202); a fluctuation component detection section (211) for detecting a fluctuation component (the fluctuation component at least not including a DC component and including a resonance frequency ($f_0$) component of the LC filter) of the DC voltage detected by the DC voltage detection section (201); a link resonance compensation section (213) for calculating an amount of compensation (amount of link resonance compensation) for reducing link resonance due to the LC filter based on the fluctuation component detected by the fluctuation component detection section (211); a limitation section (212) for limiting the amount of link resonance compensation to a predetermined range; and a compensation section (214) for correcting, by the amount of link resonance compensation limited by the limitation section (212), an input command to one (206) of the compensators (204-208) in the control calculation section that has such a control band with which it is possible to control the resonance frequency ($f_0$) of the LC filter.

A seventh aspect is according to the sixth aspect, wherein the input command to the one compensator in the control calculation section is a torque command or a current command.

An eighth aspect is according to the sixth or seventh aspect, wherein a limitation value of the limitation section (212) is set to a value that is smaller than an amplitude of a resonance component due to the LC filter where there is no correction by the amount of link resonance compensation.

A ninth aspect is according to one of the sixth to eighth aspects, wherein the DC power supplied to the inverter (140) is supplied by a converter (110) which converts AC power from the AC power supply (100) into DC power, and the fluctuation component detection section (211) includes a voltage ripple detection section (500) for detecting the ripple component due to the AC power supply (100) of the DC voltage detected by the DC voltage detection section (201), and removes the ripple component detected by the voltage ripple detection section (500) from the fluctuation component.

A tenth aspect is according to one of the sixth to ninth aspects, wherein the DC power supplied to the inverter (140) is supplied by a converter (110) which converts AC power from the AC power supply (100) into DC power, and the reactor (120) and the capacitor (130) of the LC filter are selected so that the resonance frequency ($f_0$) thereof is a frequency excluding frequencies that are integral multiples of the ripple component due to the AC power supply (100) of a voltage of the DC power supplied to the inverter (140) and frequencies in vicinity thereof.

An eleventh aspect is according to one of the sixth to tenth aspects, wherein the inverter control device further includes a voltage abnormality detection section (215) for detecting voltage abnormality of the DC voltage detected by the DC voltage detection section (201), and the limitation section (212) adjusts the range of limitation based on a detection result of the voltage abnormality detection section (215).

A twelfth aspect is according to one of the sixth to tenth aspects, wherein the inverter control device further includes a voltage abnormality detection section (215) for detecting voltage abnormality of the DC voltage detected by the DC voltage detection section (201), and the link resonance compensation section (213) adjusts the amount of link resonance compensation based on a detection result of the voltage abnormality detection section (215).

A thirteenth aspect is directed to a power conversion device including: a converter section (110) for converting AC power from an AC power supply (100) into DC power; an LC filter including a reactor (120) and a capacitor (130); an inverter section (140), to which the DC power from the converter section (110) is supplied via the LC filter, for converting the DC power into AC power having an intended frequency and an intended voltage value, and supplying the converted power to an AC motor (150); and an inverter control section (200) for controlling the inverter section (140).

In the thirteenth aspect, within a predetermined frequency band of fluctuation of a DC voltage supplied to the inverter (140), the inverter control section (200) increases an inverter output voltage supplied from the inverter (140) to a motor when the DC voltage increases, and decreases the inverter output voltage when the DC voltage decreases, whereas outside the predetermined frequency band of the DC voltage, the inverter control section (200) reduces fluctuation of the inverter output voltage due to fluctuation of the DC voltage.

A fourteenth aspect is according to the thirteenth aspect, wherein the predetermined frequency band of the DC voltage fluctuation includes at least a resonance frequency of the LC filter.

A fifteenth aspect is according to the fourteenth aspect, wherein the predetermined frequency band of the DC voltage fluctuation is less than or equal to a frequency band of a feedback control such that a current supplied to the AC motor (150) follows a command value.

A sixteenth aspect is according to the fourteenth or fifteenth aspect, wherein the predetermined frequency band is set to be less than a frequency of voltage ripples due to the AC power supply (100).

A seventeenth aspect is according to one of the thirteenth to sixteenth aspects, wherein the power conversion device operates based on an amount of fluctuation of a predetermined frequency band component of the DC voltage so as to decrease a rate of increase in an inverter output voltage supplied from the inverter (140) to the motor with respect to an amount of increase in the DC voltage, and to decrease a rate of decrease in the inverter output voltage with respect to an amount of decrease in the DC voltage, as the amount of fluctuation is larger.

An eighteenth aspect is directed to a power conversion device including: a converter section (110) for converting AC power from an AC power supply (100) into DC power; an LC filter including a reactor (120) and a capacitor (130); an inverter section (140), to which the DC power from the converter section (110) is supplied via the LC filter, for converting the DC power into AC power having an intended frequency and an intended voltage value, and supplying the converted power to an AC motor (150); and an inverter control section (200) for controlling the inverter section (140).

In the eighteenth aspect, the inverter control section (200) includes: a DC voltage detection section (201) for detecting a voltage of the DC power supplied to the inverter section (140); control calculation sections (204-208) for calculating an output voltage command; an output voltage correction section (202) for directly receiving a DC voltage value detected by the DC voltage detection section (201) so as to correct an output voltage command from the control calculation sections (204-208) based on the DC voltage value; a PWM calculation section (203) for calculating a control signal for PWM-controlling the inverter section (140) based on an output voltage command from the output voltage correction section (202); a fluctuation component detection section (211) for detecting a fluctuation component (the fluctuation component at least not including a DC component and including a resonance frequency ($f_0$) component of the LC filter) of the DC voltage detected by the DC voltage detection section (201); a link resonance compensation section (213) for calculating an amount of compensation (amount of link resonance compensation) for reducing link resonance due to the LC filter based on the fluctuation component detected by the fluctuation component detection section (211); a limitation section (212) for limiting the amount of link resonance compensation to a predetermined range; and a compensation section (214) for correcting, by the amount of link resonance compensation limited by the limitation section (212), an input command to one (206) of the compensators (204-208) in the control calculation section that has such a control band with which it is possible to control the resonance frequency ($f_0$) of the LC filter.

A nineteenth aspect is according to the eighteenth aspect, wherein the input command to the one compensator in the control calculation section is a torque command or a current command.

A twentieth aspect is according to the eighteenth or nineteenth aspect, wherein a limitation value of the limitation section (212) is set to a value that is smaller than an amplitude of a resonance component due to the LC filter where there is no correction by the amount of link resonance compensation.

A twenty-first aspect is according to one of the eighteenth to twentieth aspects, wherein the fluctuation component detection section (211) includes a voltage ripple detection section (500) for detecting the ripple component due to the AC power supply (100) of the DC voltage detected by the DC voltage detection section (201), and removes the ripple component detected by the voltage ripple detection section (500) from the fluctuation component.

A twenty-second aspect is according to one of the eighteenth to twenty-first aspects, wherein the reactor (120) and the capacitor (130) of the LC filter are selected so that the resonance frequency ($f_0$) thereof is a frequency excluding frequencies that are integral multiples of the ripple component due to the AC power supply (100) of a voltage of the DC power supplied to the inverter section (140) and frequencies in vicinity thereof.

A twenty-third aspect is according to one of the eighteenth to twenty-second aspects, wherein the power conversion device further includes a voltage abnormality detection section (215) for detecting voltage abnormality of the DC voltage detected by the DC voltage detection section (201), and the limitation section (212) adjusts the range of limitation based on a detection result of the voltage abnormality detection section (215).

A twenty-fourth aspect is according to one of the eighteenth to twenty-second aspects, wherein the power conversion device further includes a voltage abnormality detection section (215) for detecting voltage abnormality of the DC voltage detected by the DC voltage detection section (201), and the link resonance compensation section (213) adjusts the amount of link resonance compensation based on a detection result of the voltage abnormality detection section (215).

A twenty-fifth aspect is directed to an air conditioner including the power conversion device of one of the eighteenth to twenty-fourth aspects.

Advantages of the Invention

In the first to sixth and thirteenth to eighteenth aspects, the link resonance reduction control can be performed, and at the same time it is possible to quickly perform the correction operation in response to rapid voltage change such as short power interruptions, instantaneous voltage drop and return from instantaneous voltage drop.

In the sixth and eighteenth aspects, the DC voltage value from the DC voltage detection section (201) is directly input to the voltage correction section (202) without passing through a compensator or a filter. Therefore, even when rapid voltage change occurs, such as short power interruptions, instantaneous voltage drop and return from instantaneous voltage drop, the voltage correction section (202) can quickly perform the correction operation in response to the rapid voltage change. Note that in cases where noise, and the like, can cause problems, a low-pass filter may be provided which allows waveforms upon rapid voltage change and resonance frequency components of the LC filter to pass while removing noise of a frequency sufficiently higher than these components.

Since the amount of link resonance compensation is limited by the limitation section (212) to a certain range, it is possible to prevent the amount of link resonance compensation from fluctuating excessively upon rapid voltage change. If the amount of link resonance compensation fluctuates excessively, the inverter output also fluctuates significantly due to the link resonance reduction control, resulting in problems such as overcurrent. In the sixth and eighteenth aspects, however, it is possible to prevent problems such as overcurrent due to the link resonance reduction control.

Since the amount of link resonance compensation which is limited by the limitation section (212) to a certain range is input to one compensator (206) that has an appropriate control band, among all control calculation sections (204-208), the response does not have to be unnecessarily fast, thus realizing a stable control.

According to the seventh and nineteenth aspects, the resonance frequency component of link resonance can be controlled by the current control system.

Since link resonance does not need to converge rapidly, the amount of link resonance compensation does not need to be large. When the amount of link resonance compensation is large, it adversely influences the normal control operation upon rapid voltage change such as, especially, short power interruptions, and breaks down the inverter (140) in worst cases. Therefore, the range to which the amount of link resonance compensation is limited by the limitation section (212) is set so that it is possible to detect an amount of fluctuation that is needed for reducing the link resonance, and it is preferred that the range of limitation is as small as possible. In view of such circumstances, the limitation value of the limitation section (212) is set to be small in the sixth and tenth aspects, and it is therefore possible to prevent the adverse influence (output voltage fluctuation) due to the amount of link resonance compensation.

In other words, the operation is performed based on the amount of fluctuation of the predetermined frequency band component of the DC voltage so as to decrease the rate of increase in the inverter output voltage supplied from the inverter (140) to the motor with respect to the amount of increase in the DC voltage, and to decrease the rate of decrease in the inverter output voltage with respect to the amount of decrease in the DC voltage, as the amount of fluctuation is larger, thereby making it possible to prevent the adverse influence (output voltage fluctuation) due to the amount of link resonance compensation.

According to the ninth and twenty-first aspects, even if the frequency component of link resonance and the frequency component of the ripples of the DC voltage are close to each other, it is possible to distinguish these from each other (to extract only the frequency component of link resonance).

If the frequency component of the link resonance is equal to the frequency component of the ripples of the DC voltage due to the AC power supply (100), the resonance increases. Moreover, it is not possible to distinguish link resonance and ripples from each other, and the control of reducing the link resonance does not operate normally. According to the tenth and twenty-second aspects, it is possible to distinguish link resonance and voltage ripples from each other, and it is possible to prevent the link resonance from increasing due to the ripple component of the DC voltage.

Upon voltage abnormality (e.g., upon rapid voltage change such as short power interruptions, instantaneous voltage drop, and return from instantaneous voltage drop), the link resonance reduction control operates so that DC voltage increase→output voltage increase, and DC voltage decrease→output voltage decrease. Since this operation (particularly when the DC voltage increases) acts as a disturbance, the limitation section (212) is provided for preventing adverse influences (e.g., overcurrent). In the eleventh and twenty-third aspects, the range of limitation by the limiter (212) is adjusted based on the detection result of the voltage abnormality detection section (215). For example, the range of limitation is reduced during voltage abnormality so as to reduce the fluctuation of the output voltage due to the resonance reduction control, and the range of limitation is increased during normal state so that the resonance reduction control operates normally. Thus, it is no longer necessary to set the range of limitation based on conditions during voltage abnormality, thereby making it easier to set the range of limitation.

In the twelfth and twenty-fourth aspects, the amount of link resonance compensation is adjusted based on the detection result of the voltage abnormality detection section (215). For example, the amount of link resonance compensation is reduced during voltage abnormality so as to reduce the fluctuation of the output voltage due to the resonance reduction control, and the amount of link resonance compensation is increased during normal state so that the resonance reduction control operates normally. Thus, it is no longer necessary to set (the constant of) the link resonance compensator (213) based on conditions during voltage abnormality, thereby making it easier to set (the constant of) the link resonance compensator (213).

DESCRIPTION OF EMBODIMENTS

Figure 1:
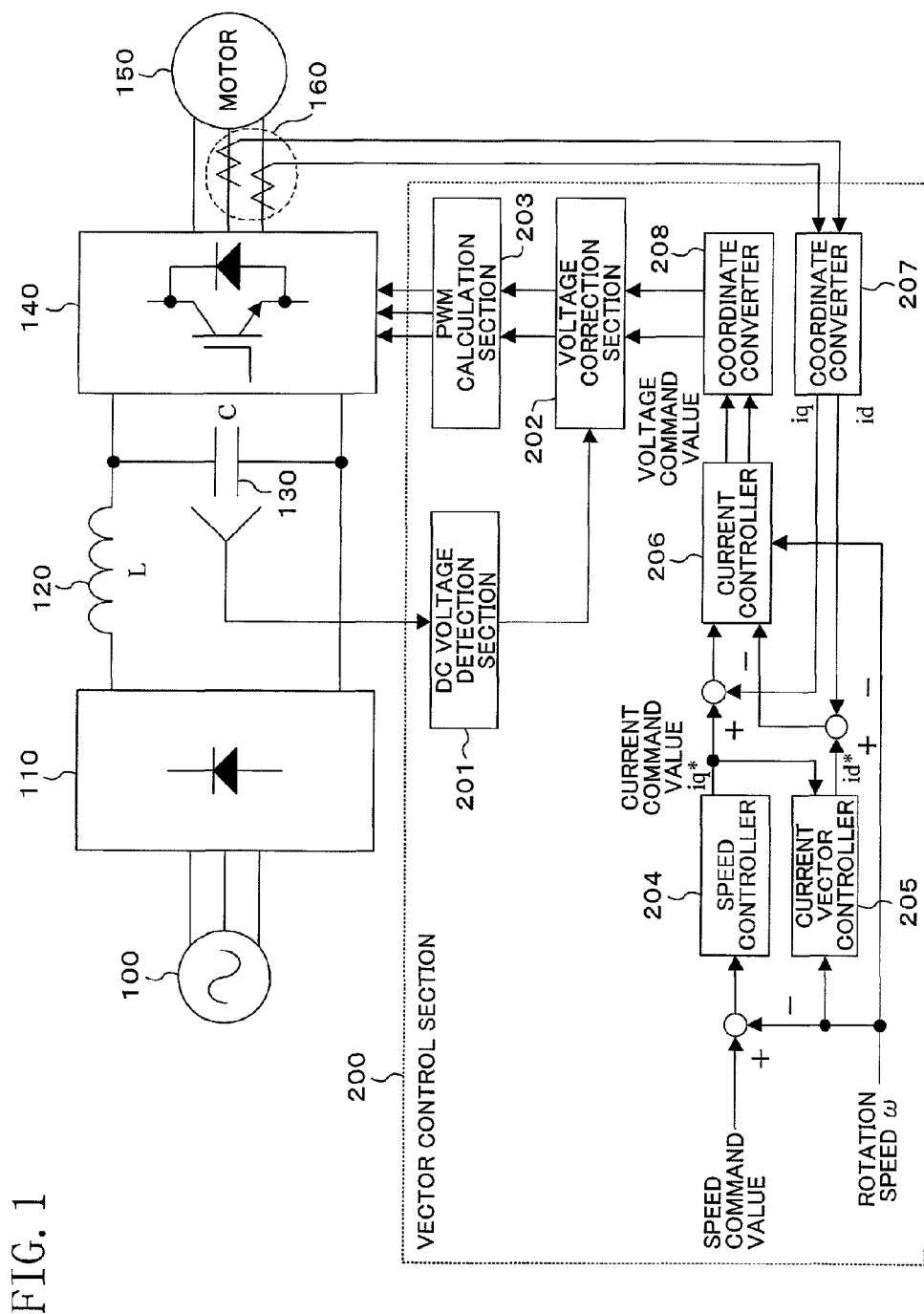
FIG. 1 is a block diagram showing a schematic configuration of a conventional inverter device.
Figure 2:
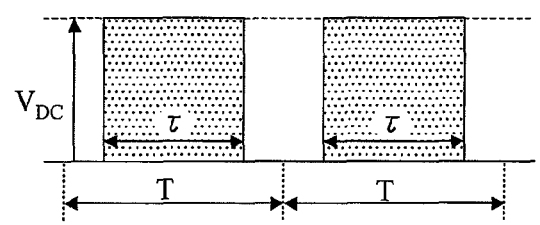
FIG. 2 is a diagram showing the relationship between the DC input voltage $V_{DC}$, the carrier period T, and the pulse width τ.

Embodiments of the present invention will now be described in detail with reference to the drawings. Note that essentially identical elements are denoted by the same reference numerals throughout the figures. The following description of preferred embodiments is merely illustrative in essence, and is not intended to limit the present invention or the application and uses thereof.

(First Embodiment)

Figure 3:
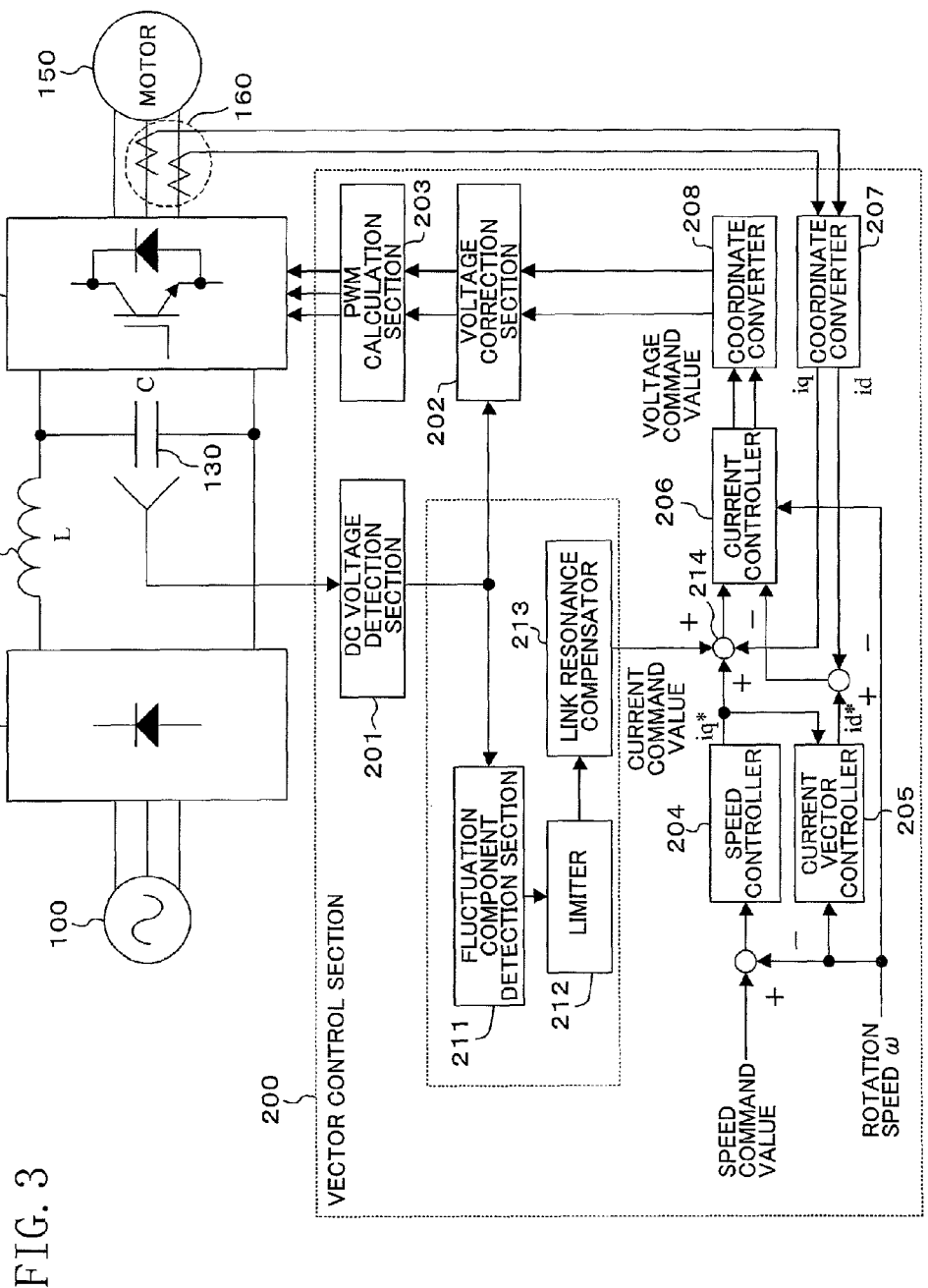
FIG. 3 is a block diagram showing a schematic configuration of an inverter device according to a first embodiment.

FIG. 3 shows a schematic configuration of an inverter device of the first embodiment. The inverter device is obtained by adding, to the elements shown in FIG. 1, a loop of a fluctuation component detection section (211) a limiter (212) a link resonance compensator (213).

That is, within a predetermined frequency band of fluctuation of a DC voltage supplied to the inverter (140), the inverter control section (200) increases the inverter output voltage supplied from the inverter (140) to the motor when the DC voltage increases, and decreases the inverter output voltage when the DC voltage decreases, whereas outside the predetermined frequency band of DC voltage, the inverter control section (200) reduces the fluctuation of the inverter output voltage due to the fluctuation of the DC voltage.

The predetermined frequency band of DC voltage fluctuation at least includes the resonance frequency of the LC filter.

The predetermined frequency band of DC voltage fluctuation is less than or equal to the frequency band of feedback control such that the current supplied to the AC motor (150) follows a command value.

The predetermined frequency band is set to be less than the frequency of the voltage ripples due to an AC power supply (100).

The inverter control section (200) operates based on the amount of fluctuation of the predetermined frequency band component of the DC voltage so as to decrease the rate of increase in the inverter output voltage supplied from the inverter (140) to the motor with respect to the amount of increase in the DC voltage, and to decrease the rate of decrease in the inverter output voltage with respect to the amount of decrease in the DC voltage, as the amount of fluctuation is larger.

Conditions that should be met by the above components will now be shown.

[Fluctuation Component Detection Section (211)]

The fluctuation component detection section (211) removes the DC component of the voltage detected by DC voltage detection section (201) and allows the resonance frequency ($f_0$) Hz [Expression 5] to pass. For example, the fluctuation component detection section (211) can be implemented by a high-pass filter whose cut-off frequency is set to be sufficiently lower than ($f_0$) Hz.

[Limiter (212)]

The limiter (212) limits the fluctuation component detected by the fluctuation component detection section (211) to a predetermined range of values. The range of limitation is set so that it is possible to detect an amount of fluctuation that is needed for reducing the link resonance. It is preferred that the range of limitation is as small as possible. Then, it is possible to reduce the influence on the control particularly upon rapid voltage increase.

[Link Resonance Compensator (213)]

The compensator (213) is designed so that the link resonance can be reduced. The compensator (213) is preferably selected so that there is no phase lag at the resonance frequency ($f_0$) Hz, and is implemented by a P control (proportion control), for example. It is sufficient if the link resonance converges within one second, and it is selected so that the gain of the compensator (213) will not be too large.

The resonance frequency ($f_0$) Hz [Expression 5] of the LC filter including the reactor (120) and the capacitor (130) is set so that it is not equal to the frequency component of the DC voltage ripples due to the AC power supply (100). For example, where the three-phase AC power supply (100) having a frequency (f) is full-wave-rectified by a converter section (110), since the frequency component of the DC voltage ripples due to the AC power supply (100) is 6f, the resonance frequency ($f_0$) of the LC filter is set to a frequency other than 6fn (n is an integer) and the vicinity thereof (e.g., 6fn−5 to 6fn+5). Where the single-phase AC power supply (100) having a frequency (f) is full-wave-rectified by the converter section (110), since the frequency component of the DC voltage ripples due to the AC power supply (100) is 2f, the resonance frequency of the LC filter is set to a frequency other than 2fn (n is an integer) and the vicinity thereof (e.g., 2fn−5 to 2fn+5).

Note that while a high-pass filter whose cut-off frequency is set to be sufficiently lower than ($f_0$) Hz is used as an example of the fluctuation component detection section (211), it may be a bandpass filter that allows only a frequency component in the vicinity of ($f_0$) Hz to pass. In a configuration where the AC power supply (100) is rectified to be used as the DC power supply, using a bandpass filter is advantageous in that it is possible to remove the voltage ripples due to the power supply frequency of the AC power supply (100). This is useful for cases where the capacitor (130) having a small capacity is used and cases where a single-phase AC power supply is used as the AC power supply (100).

While the limiter (212) is provided on the output side of the fluctuation component detection section (211) in FIG. 3, it may be provided at any place as long as it is before the adjustment section (an adder (214) in FIG. 3) for adjusting the amount of compensation. For example, it may be provided both on the input side and on the output side of the link resonance compensator (213). Where there is an integrated term in the link resonance compensator (213), it is possible to prevent the integrated term from becoming excessive upon rapid voltage change due to short power interruptions, or the like, by providing the limiter (212) on the output side of the fluctuation component detection section (211).

In the inverter device of FIG. 3, the provision of the limiter (212) makes it possible to distinguish between voltage abnormality (upon short power interruptions, upon instantaneous voltage drop, upon return from instantaneous voltage drop, etc.) and normal state.

Where the link resonance reduction is performed, the rate of change (gradient) of the resonance component is needed. As long as the rate of change (gradient) is known, the control can be achieved without problems even if the range is limited by the limiter (212).

On the other hand, voltage abnormality has a problem in that the amount of change of the voltage is greater than the link resonance. By limiting the amount of change of the voltage, it is possible to limit the adverse influence (e.g., overcurrent) of voltage abnormality on the link resonance reduction control.

Thus, it is possible to limit the adverse influence of voltage abnormality without significantly influencing the link resonance reduction control by setting the range of limitation by the limiter (212) to a range that is needed for detecting the rate of change (gradient) of the resonance component required for link resonance reduction.

For example, the range of limitation by the limiter (212) is set to be smaller than the amplitude of the resonance component for a case where link resonance reduction is not performed.

The method for selecting the compensator for correcting the input command by the amount of link resonance compensation will be described by way of a specific example. Shown below are examples of the constant of the LC filter, the control band of the controller and the carrier frequency in the circuit configuration of FIG. 3.

Reactor (120): L=4.5 mH
Capacitor (130): C=1000 μF
Resonance frequency ($f_0$) of LC filter: 75 Hz
Control band of speed controller (204): 10 Hz
Control band of current controller (206): 200 Hz
PWM carrier frequency: 5 kHz In order to control the component of the resonance frequency ($f_0$)=75 Hz in this configuration, the amount of link resonance compensation may be input to a calculation section whose control band is greater than 75 Hz, such as the current controller (206) or the PWM calculation section (203). However, the PWM calculation section (203), which has a wide control band, may perform compensation even for a high-frequency component upon voltage abnormality such as short power interruptions, thus becoming unstable. Here, since the current control system has a sufficient control band, the compensator of the current controller (206) is selected as a compensator for correcting the input command, and correction is done by adding the amount of link resonance compensation to the current command value.

With such a configuration, components greater than or equal to the control band of the current control system can be prevented from influencing the control.

The DC voltage value from the DC voltage detection section (201) is directly input to the voltage correction section (202). Upon voltage abnormality (upon short power interruptions, upon instantaneous voltage drop, upon return from instantaneous voltage drop, etc.), the voltage changes rapidly, and it is therefore necessary that the response of the voltage correction is fast. For example, if there is a delay in detecting the output voltage when the DC voltage is increasing rapidly, the voltage correction does not operate normally and the output voltage increases rapidly, resulting in overcurrent, which leads to shutdown or breakdown of the inverter. By directly inputting the DC voltage value, the voltage correction can be performed quickly, and it is possible to prevent fluctuation of the output voltage, particularly the overcurrent due to the rapid increase in the output voltage when the DC voltage is increasing.

As described above, in the first embodiment, the link resonance reduction control and the voltage correction (constant output voltage control) are both realized at the same time even when rapid voltage change occurs, by meeting the following three criteria.

(1) To input the DC voltage value directly to the voltage correction section (202).

Upon voltage abnormality such as short power interruptions, instantaneous voltage drop or return from instantaneous voltage drop, the DC voltage changes within a short period of time. In order to appropriately perform the voltage correction by the voltage correction section (202) against this rapid change, a high-speed operation is needed. In the present embodiment, the DC voltage value from the DC voltage detection section (201) is input directly to the voltage correction section (202) without passing through a compensator or a filter, and the voltage correction section (202) can therefore perform a correction operation quickly in response to voltage abnormality, realizing appropriate voltage correction even when voltage abnormality occurs.

(2) To input the amount of link resonance compensation to the current control system (use a compensator of an appropriate control band).

A compensator (206) having a control band such that link resonance can be compensated for is used to compensate for link resonance. Then, it is possible to distinguish it from voltage correction based on the difference in control band, and therefore the link resonance reduction control and the constant output voltage control do not interfere with each other.

(3) To provide the limiter (212) to distinguish between voltage abnormality and link resonance.

The link resonance reduction control is a control for adjusting the resistor characteristics of the inverter, and is a control for moving the resistor characteristics toward the positive side or in the positive direction. What is needed in link resonance reduction control is the change (rate) of the voltage, and the control can be done with no problems even with limitations imposed by the limiter (212). On the other hand, voltage abnormality is a phenomenon in which the DC voltage changes rapidly, and it is possible to prevent the amount of link resonance compensation from fluctuating excessively when the voltage changes rapidly, by limiting the amount of link resonance compensation to a certain range by the limiter (212). If the amount of link resonance compensation fluctuates excessively, the inverter output is also fluctuated significantly by the link resonance reduction control, resulting in problems such as overcurrent, but the present embodiment can prevent problems due to the link resonance reduction control such as overcurrent.

Now, an exemplary configuration of the fluctuation component detection section (211) shown in FIG. 3 will be illustrated.

Figure 4:
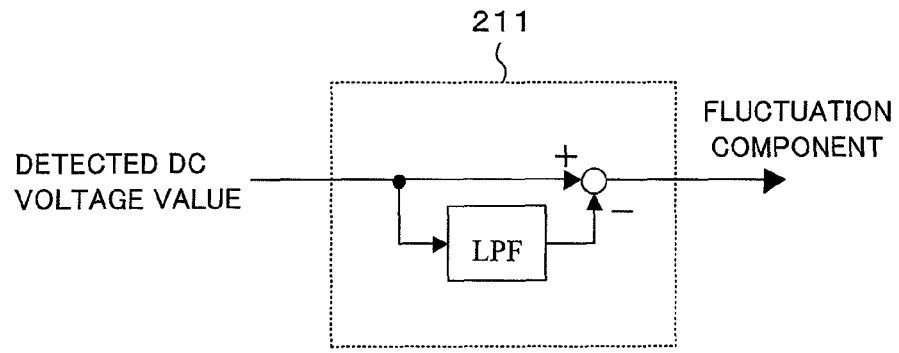
FIG. 4 is a block diagram showing an exemplary internal configuration of a fluctuation component detection section of FIG. 1.

FIG. 4 shows an exemplary configuration of the fluctuation component detection section (211) in a circuit with little DC voltage ripples due to the AC power supply (100), e.g., where the three-phase AC power supply (100) is full-wave-rectified by the converter section (110) or where the capacity of the capacitor (130) is large. In this configuration, the cut-off frequency of the LPF (low-pass filter) is set to be lower than the resonance frequency of link resonance. In this configuration, an LPF is used to obtain a low-frequency component, and the low-frequency component is subtracted from the detected DC voltage value to thereby extract a high frequency component including a link resonance component.

Figure 5:
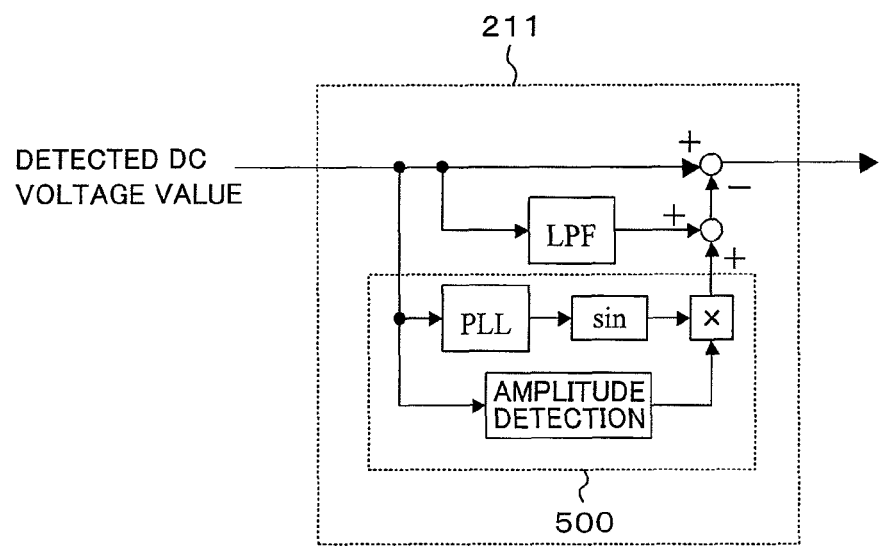
FIG. 5 is a block diagram showing an exemplary internal configuration of the fluctuation component detection section of FIG. 1.

FIG. 5 shows an exemplary configuration of the fluctuation component detection section (211) in a circuit with significant DC voltage ripples due to the AC power supply (100), e.g., where the AC power supply (100) is a single-phase AC power supply or where the capacity of the capacitor (130) is small. In this configuration, the cut-off frequency of the LPF (low-pass filter) is set to be lower than the resonance frequency of link resonance. The PLL of a ripple component extraction section (500) is set so as to detect the phase of the ripple component due to the AC power supply (100). For example, it is synchronized with the 2f [Hz] component in a configuration where single-phase AC having a frequency f [Hz] is full-wave-rectified, and with the 6f [Hz] component in a configuration where three-phase AC is full-wave-rectified. The amplitude detection section of the ripple component extraction section (500) detects the amplitude of the ripple component due to the AC power supply (100).

With the configuration of FIG. 5, an LPF is used to obtain the low-frequency component, and the PLL and the amplitude detection section of the ripple extraction section (500) are used to obtain the ripple component due to the AC power supply (100) so as to extract the link resonance component by subtracting these components from the detected DC voltage value.

The configuration of FIG. 5 is useful in cases where, for example, the frequency of the resonance component of link resonance and the frequency of the ripple component due to the AC power supply (100) are close to each other, and it is difficult to make a distinction therebetween by a filter (e.g., phase delay). Note that any other configuration may be used as long as it is possible to extract the ripple component due to the AC power supply (100), and it may be a configuration where the phase and the amplitude of the ripple component are extracted by using Fourier transformation, for example.

(Second Embodiment)

Figure 6:
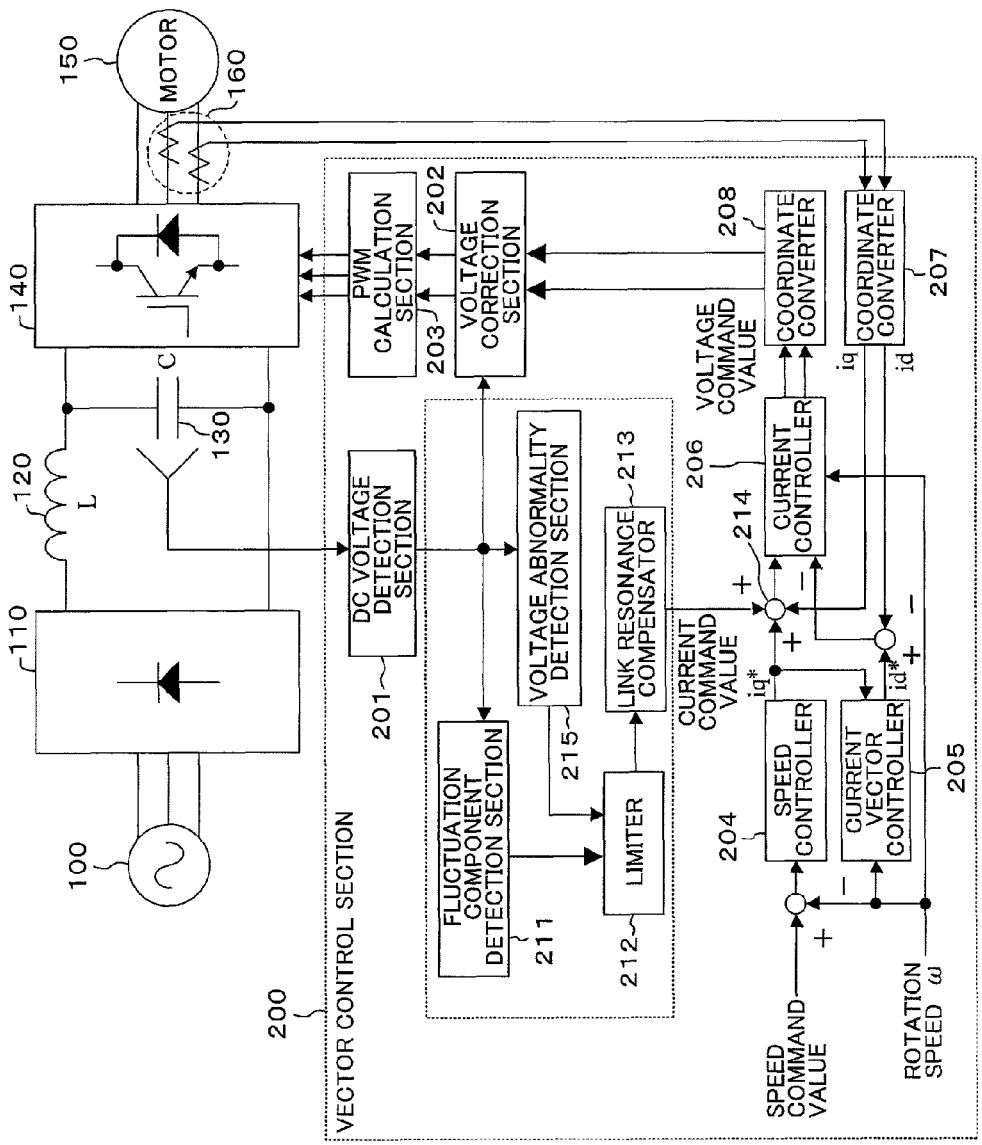
FIG. 6 is a block diagram showing a schematic configuration of an inverter device according to a second embodiment.

FIG. 6 shows a schematic configuration of an inverter device according to the second embodiment. With this inverter device, a voltage abnormality detection section (215), and the process of changing the limitation value of the limiter (212) based on the detection result by the voltage abnormality detection section (215) are added to the inverter device of FIG. 3.

With this inverter device, the range of limitation by the limiter (212) is adjusted based on the detection result of the voltage abnormality detection section (215). For example, the range of limitation is reduced during voltage abnormality so as to reduce the fluctuation of the output voltage due to the resonance reduction control, and the range of limitation is increased during normal state so that the resonance reduction control operates normally. Thus, it is no longer necessary to set the range of limitation based on conditions during voltage abnormality, thereby making it easier to set the range of limitation.

The amount of link resonance compensation by the link resonance compensator (213) may be adjusted based on the detection result of the voltage abnormality detection section (215). For example, the amount of link resonance compensation is reduced during voltage abnormality so as to reduce the fluctuation of the output voltage due to the resonance reduction control, and the amount of link resonance compensation is increased during normal state so that the resonance reduction control operates normally. Thus, it is no longer necessary to set (the constant of) the link resonance compensator (213) based on conditions during voltage abnormality, thereby making it easier to set (the constant of) the link resonance compensator (213).

INDUSTRIAL APPLICABILITY

An inverter control device of the present invention and a power conversion device having the same are applicable to air conditioners, for example.

DESCRIPTION OF REFERENCE CHARACTERS

100 AC power supply
110 Converter section
120 Reactor
130 Capacitor
140 Inverter section
150 Motor
160 Output current detection section
200 Vector control section
201 DC voltage detection section
202 Voltage correction section
203 PWM calculation section
204 Speed controller
205 Current vector controller
206 Current controller
207 Coordinate converter
208 Coordinate converter
215 Voltage abnormality detection section
500 Ripple component extraction section

The invention claimed is:

1. An inverter control device for controlling an inverter which converts DC power supplied thereto via an LC filter including a reactor and a capacitor into AC power having an intended frequency and an intended voltage value, and supplies the converted power to an AC motor, wherein
a fluctuation component detection section configured to allow passage of a resonance frequency of the LC filter allows the inverter control device, within a predetermined frequency band of fluctuation of a DC voltage supplied to the inverter, to increase an inverter output voltage supplied from the inverter to a motor when the DC voltage increases, and to decrease the inverter output voltage when the DC voltage decreases, whereas the inverter control device is configured, within a frequency region that is an upper frequency region above the predetermined frequency band of the DC voltage and that is a frequency region of fluctuation when a power supply and a voltage rapidly change and a lower frequency region below the predetermined frequency band, to reduce fluctuation of the inverter output voltage due to fluctuation of the DC voltage, the predetermined frequency band of the DC voltage fluctuation including at least the resonance frequency of the LC filter, and being less than or equal to a frequency band of a feedback control in a current controller configured to control such that a current supplied to the AC motor follows a command value.

2. The inverter control device of claim 1, wherein the predetermined frequency band is set to be less than a frequency of voltage ripples due to an AC power supply.

3. The inverter control device of claim 2, wherein the inverter control device operates based on an amount of fluctuation of a predetermined frequency band component of the DC voltage so as to decrease a rate of increase in an inverter output voltage supplied from the inverter to the motor with respect to an amount of increase in the DC voltage, and to decrease a rate of decrease in the inverter output voltage with respect to an amount of decrease in the DC voltage, as the amount of fluctuation is larger.

4. The inverter control device of claim 1, wherein the inverter control device operates based on an amount of fluctuation of a predetermined frequency band component of the DC voltage so as to decrease a rate of increase in an inverter output voltage supplied from the inverter to the motor with respect to an amount of increase in the DC voltage, and to decrease a rate of decrease in the inverter output voltage with respect to an amount of decrease in the DC voltage, as the amount of fluctuation is larger.

5. An inverter control device for controlling an inverter which converts DC power supplied thereto via an LC filter including a reactor and a capacitor into AC power having an intended frequency and an intended voltage value, and supplies the converted power to an AC motor, the inverter control device comprising:

control calculation sections for calculating an output voltage command;

an output voltage correction section for directly receiving a DC voltage value from a DC voltage detection section which detects a voltage of DC power supplied to the inverter so as to correct an output voltage command from the control calculation sections based on the DC voltage value;

a PWM calculation section for calculating a control signal for PWM-controlling the inverter based on an output voltage command from the output voltage correction section;

a fluctuation component detection section for detecting a fluctuation component (the fluctuation component at least not including a DC component and including a resonance frequency ($f_0$) component of the LC filter) of the DC voltage detected by the DC voltage detection section;

a link resonance compensation section for calculating an amount of compensation (amount of link resonance compensation) for reducing link resonance due to the LC filter based on the fluctuation component detected by the fluctuation component detection section;

a limitation section for limiting the amount of link resonance compensation to a predetermined range; and a correction section for correcting, by the amount of link resonance compensation limited by the limitation section, an input command to one of the compensators in the control calculation section that has such a control band with which it is possible to control the resonance frequency ($f_0$) of the LC filter.

6. The inverter control device of claim 5, wherein the input command to the one compensator in the control calculation section is a torque command or a current command.

7. The inverter control device of claim 5, wherein a limitation value of the limitation section is set to a value that is smaller than an amplitude of a resonance component due to the LC filter where there is no correction by the amount of link resonance compensation.

8. The inverter control device of claim 5, wherein the DC power supplied to the inverter is supplied by a converter which converts AC power from the AC power supply into DC power, and the fluctuation component detection section includes a voltage ripple detection section for detecting the ripple component due to the AC power supply of the DC voltage detected by the DC voltage detection section, and removes the ripple component detected by the voltage ripple detection section from the fluctuation component.

9. The inverter control device of claim 5, wherein the DC power supplied to the inverter is supplied by a converter which converts AC power from the AC power supply into DC power, and the reactor and the capacitor of the LC filter are selected so that the resonance frequency ($f_0$) thereof is a frequency excluding frequencies that are integral multiples of the ripple component due to the AC power supply of a voltage of the DC power supplied to the inverter and frequencies in vicinity thereof.

10. The inverter control device of claim 5, wherein the inverter control device further includes a voltage abnormality detection section for detecting voltage abnormality of the DC voltage detected by the DC voltage detection section, and the limitation section adjusts the range of limitation based on a detection result of the voltage abnormality detection section.

11. The inverter control device of claim 5, wherein the inverter control device further includes a voltage abnormality detection section for detecting voltage abnormality of the DC voltage detected by the DC voltage detection section, and the link resonance compensation section adjusts the amount of link resonance compensation based on a detection result of the voltage abnormality detection section.

12. A power conversion device comprising:
a converter section for converting AC power from an AC power supply into DC power;
an LC filter including a reactor and a capacitor;
an inverter section, to which the DC power from the converter section is supplied via the LC filter, for converting the DC power into AC power having an intended frequency and an intended voltage value, and supplying the converted power to an AC motor; and
an inverter control section for controlling the inverter section, wherein within a predetermined frequency band of fluctuation of a DC voltage supplied to the inverter, a fluctuation component detection section configured to allow passage of a resonance frequency of the LC filter allows the inverter control section to increase an inverter output voltage supplied from the inverter to a motor when the DC voltage increases, and to decrease the inverter output voltage when the DC voltage decreases, whereas, within a frequency region that is an upper frequency region above the predetermined frequency band of the DC voltage and that is a frequency region of fluctuation when a power supply and a voltage rapidly change and a lower frequency region below the predetermined frequency band, the inverter control section reduces fluctuation of the inverter output voltage due to fluctuation of the DC voltage, the predetermined frequency band of the DC voltage fluctuation including at least the resonance frequency of the LC filter, and being less than or equal to a frequency band of a feedback control in a current controller configured to control such that a current supplied to the AC motor follows a command value.

13. The power conversion device of claim 12, wherein the predetermined frequency band is set to be less than a frequency of voltage ripples due to the AC power supply.

14. The power conversion device of claim 13, wherein the power conversion device operates based on an amount of fluctuation of a predetermined frequency band component of the DC voltage so as to decrease a rate of increase in an inverter output voltage supplied from the inverter to the motor with respect to an amount of increase in the DC voltage, and to decrease a rate of decrease in the inverter output voltage with respect to an amount of decrease in the DC voltage, as the amount of fluctuation is larger.

15. The power conversion device of claim 12, wherein the power conversion device operates based on an amount of fluctuation of a predetermined frequency band component of the DC voltage so as to decrease a rate of increase in an inverter output voltage supplied from the inverter to the motor with respect to an amount of increase in the DC voltage, and to decrease a rate of decrease in the inverter output voltage with respect to an amount of decrease in the DC voltage, as the amount of fluctuation is larger.

16. A power conversion device comprising:
a converter section for converting AC power from an AC power supply into DC power;
an LC filter including a reactor and a capacitor;
an inverter section, to which the DC power from the converter section is supplied via the LC filter, for converting the DC power into AC power having an intended frequency and an intended voltage value, and supplying the converted power to an AC motor; and
an inverter control section for controlling the inverter section, the inverter control section comprising:
a DC voltage detection section for detecting a voltage of the DC power supplied to the inverter section;
control calculation sections for calculating an output voltage command;
an output voltage correction section for directly receiving a DC voltage value detected by the DC voltage detection section so as to correct an output voltage command from the control calculation sections based on the DC voltage value;
a PWM calculation section for calculating a control signal for PWM-controlling the inverter section based on an output voltage command from the output voltage correction section;
a fluctuation component detection section for detecting a fluctuation component (the fluctuation component at least not including a DC component and including a resonance frequency ($f_0$) component of the LC filter) of the DC voltage detected by the DC voltage detection section;
a link resonance compensation section for calculating an amount of compensation (amount of link resonance compensation) for reducing link resonance due to the LC filter based on the fluctuation component detected by the fluctuation component detection section;
a limitation section for limiting the amount of link resonance compensation to a predetermined range; and
a correction section for correcting, by the amount of link resonance compensation limited by the limitation section, an input command to one of the compensators in the control calculation section that has such a control band with which it is possible to control the resonance frequency ($f_0$) of the LC filter.

17. The power conversion device of claim 16, wherein the input command to the one compensator in the control calculation section is a torque command or a current command.

18. The power conversion device of claim 16, wherein a limitation value of the limitation section is set to a value that is smaller than an amplitude of a resonance component due to the LC filter where there is no correction by the amount of link resonance compensation.

19. The power conversion device of claim 16, wherein the fluctuation component detection section includes a voltage ripple detection section for detecting the ripple component due to the AC power supply of the DC voltage detected by the DC voltage detection section, and removes the ripple component detected by the voltage ripple detection section from the fluctuation component.

20. The power conversion device of claim 16, wherein the reactor and the capacitor of the LC filter are selected so that the resonance frequency ($f_0$) thereof is a frequency excluding frequencies that are integral multiples of the ripple component due to the AC power supply of a voltage of the DC power supplied to the inverter section and frequencies in vicinity thereof.

21. The power conversion device of claim 16, wherein the power conversion device further includes a voltage abnormality detection section for detecting voltage abnormality of the DC voltage detected by the DC voltage detection section, and
the limitation section adjusts the range of limitation based on a detection result of the voltage abnormality detection section.

22. The power conversion device of claim 16, wherein the power conversion device further includes a voltage abnormality detection section for detecting voltage abnormality of the DC voltage detected by the DC voltage detection section, and
the link resonance compensation section adjusts the amount of link resonance compensation based on a detection result of the voltage abnormality detection section.

23. An air conditioner comprising the power conversion device of claim 16.

* * * * *